(12) United States Patent
Seeberger

(10) Patent No.: US 11,571,645 B2
(45) Date of Patent: Feb. 7, 2023

(54) FIBROUS NONWOVEN AND METHOD FOR THE PRODUCTION THEREOF

(71) Applicant: IREMA-FILTER GmbH, Postbauer-Pavelsbach (DE)

(72) Inventor: Andreas Seeberger, Nüremberg (DE)

(73) Assignee: IREMEA-FILTER GMBH, Postbauer-Pavel (DE)

( * ) Notice: Subject to any disclaimer, the term of this patent is extended or adjusted under 35 U.S.C. 154(b) by 0 days.

(21) Appl. No.: 14/646,155

(22) PCT Filed: May 13, 2014

(86) PCT No.: PCT/EP2014/001290
§ 371 (c)(1),
(2) Date: May 20, 2015

(87) PCT Pub. No.: WO2014/183866
PCT Pub. Date: Nov. 20, 2014

(65) Prior Publication Data
US 2016/0051917 A1  Feb. 25, 2016

(30) Foreign Application Priority Data
May 16, 2013  (DE) .................... 10 2013 008 402.4

(51) Int. Cl.
*B01D 39/00* (2006.01)
*B01D 39/16* (2006.01)
(Continued)

(52) U.S. Cl.
CPC ....... *B01D 39/163* (2013.01); *B01D 46/0001* (2013.01); *B01D 46/521* (2013.01);
(Continued)

(58) Field of Classification Search
CPC .... B01D 46/01; B01D 46/521; B01D 39/163; B01D 39/00; B01D 46/00; B01D 46/0001;
(Continued)

(56) References Cited

U.S. PATENT DOCUMENTS 3,557,801 A   1/1971  Jamison
3,825,380 A   7/1974  Harding
(Continued)

FOREIGN PATENT DOCUMENTS

CN   101757809   6/2010
CN   101410162   1/2012
(Continued)

OTHER PUBLICATIONS

Dahiya et al., Meltblown Technology, Apr. 2004.
(Continued)

*Primary Examiner* — T. Bennett McKenzie
(74) *Attorney, Agent, or Firm* — Niels Haun; Dann, Dorfman, Herrell & Skillman, P.C.

(57) ABSTRACT

The invention relates to a fibrous nonwoven, in particular for a filter medium, having a first layer, wherein at least one single-piece fiber strand of said first layer has a first fiber portion and a second fiber portion in the longitudinal direction, and wherein the fiber strand has a thickening substantially in said second fiber portion.

23 Claims, 9 Drawing Sheets

(51) Int. Cl.
    *D01D 5/098*     (2006.01)
    *D04H 3/007*     (2012.01)
    *D04H 3/03*     (2012.01)
    *D01D 5/20*     (2006.01)
    *D01F 6/88*     (2006.01)
    *D01F 6/44*     (2006.01)
    *D04H 1/4391*     (2012.01)
    *B01D 46/00*     (2022.01)
    *B01D 46/52*     (2006.01)
    *D04H 3/033*     (2012.01)

(52) U.S. Cl.
    CPC ............ *D01D 5/0985* (2013.01); *D01D 5/20* (2013.01); *D01F 6/44* (2013.01); *D01F 6/88* (2013.01); *D04H 1/43918* (2020.05); *D04H 3/007* (2013.01); *D04H 3/03* (2013.01); *D04H 3/033* (2013.01); *B01D 2239/065* (2013.01); *B01D 2239/1216* (2013.01); *D10B 2505/04* (2013.01)

(58) Field of Classification Search
    CPC ...... B01D 2239/065; B01D 2239/1216; D01F 6/44; D01F 6/88; D04H 3/03; D04H 3/07; D04H 3/33; D04H 3/65; D04H 1/4391; D04H 3/007; D04H 3/033; D01D 5/0985; D01D 5/20; D10B 2505/04
    USPC .......................................................... 55/521
    See application file for complete search history.

(56) References Cited

U.S. PATENT DOCUMENTS

| | | | |
|---|---|---|---|
| 4,018,678 A * | 4/1977 | Peniston | A24D 3/06 55/528 |
| 4,118,531 A | 10/1978 | Hauser | |
| 4,173,504 A | 11/1979 | Tomioka | |
| 4,551,402 A | 11/1985 | Tamura | |
| 4,592,815 A | 6/1986 | Nakao | |
| 4,714,647 A | 12/1987 | Shipp, Jr. | |
| 4,720,252 A | 1/1988 | Appel | |
| 4,741,941 A | 5/1988 | Englebert | |
| 4,886,527 A | 12/1989 | Fottinger | |
| 4,983,434 A | 1/1991 | Sassa | |
| 5,066,400 A | 11/1991 | Rocklitz | |
| 5,089,202 A | 2/1992 | Lippold | |
| 5,172,585 A | 12/1992 | Gleissle | |
| 5,283,106 A | 2/1994 | Seiler | |
| 5,350,624 A | 9/1994 | Georger | |
| 5,456,069 A | 10/1995 | Haerle | |
| 5,486,410 A * | 1/1996 | Groeger | A62D 5/00 442/353 |
| 5,593,768 A * | 1/1997 | Gessner | A61F 13/51401 442/346 |
| 5,609,947 A * | 3/1997 | Kamei | B32B 5/26 210/490 |
| 5,670,044 A | 9/1997 | Ogata | |
| 5,672,399 A | 9/1997 | Kahlbaugh | |
| 5,681,469 A | 10/1997 | Barboza et al. | |
| 5,685,757 A | 11/1997 | Kirsch | |
| 5,714,067 A * | 2/1998 | Sorrick | B01D 39/1623 210/490 |
| 5,817,415 A | 10/1998 | Chou | |
| 5,877,098 A | 3/1999 | Tanaka | |
| 6,071,419 A | 6/2000 | Beier | |
| 6,110,243 A | 8/2000 | Wnenchak | |
| 6,114,017 A | 9/2000 | Fabbricante | |
| 6,123,752 A | 9/2000 | Wu | |
| 6,146,436 A | 11/2000 | Hollingsworth | |
| 6,315,805 B1 | 11/2001 | Strauss | |
| 6,319,865 B1 | 11/2001 | Mikami | |
| 6,322,604 B1 * | 11/2001 | Midkiff | B01D 39/163 55/528 |
| 6,387,144 B1 | 5/2002 | Jaroszczyk | |
| 6,454,989 B1 * | 9/2002 | Neely | D01F 8/06 264/103 |
| 7,527,671 B1 | 5/2009 | Stuecker | |
| 7,625,418 B1 | 12/2009 | Choi | |
| 7,625,433 B2 | 12/2009 | Bach | |
| 8,021,467 B2 | 9/2011 | Zimmer | |
| 8,211,195 B2 | 7/2012 | Bass | |
| 8,308,834 B2 | 11/2012 | Smithies | |
| 8,715,391 B2 | 5/2014 | Wang | |
| 8,834,762 B2 | 9/2014 | Jung | |
| 9,242,201 B2 | 1/2016 | Bao | |
| 2002/0037678 A1 * | 3/2002 | Ohata | B32B 5/04 442/328 |
| 2002/0037679 A1 | 3/2002 | Bansal | |
| 2002/0095920 A1 | 7/2002 | Takagaki | |
| 2002/0122953 A1 * | 9/2002 | Zhou | C09J 123/10 428/517 |
| 2003/0037675 A1 * | 2/2003 | Gillingham | D01D 5/0038 55/528 |
| 2003/0200991 A1 | 10/2003 | Keck | |
| 2003/0201579 A1 | 10/2003 | Gordon | |
| 2004/0245171 A1 | 12/2004 | Schimmel | |
| 2005/0054255 A1 | 3/2005 | Morman | |
| 2005/0129897 A1 | 6/2005 | Zhou | |
| 2005/0139544 A1 | 6/2005 | Choi | |
| 2005/0235619 A1 | 10/2005 | Heinz | |
| 2005/0266760 A1 * | 12/2005 | Chhabra | D04H 3/02 442/350 |
| 2006/0000196 A1 | 1/2006 | Beier | |
| 2006/0014460 A1 | 1/2006 | Alexander | |
| 2006/0096263 A1 * | 5/2006 | Kahlbaugh | B01D 46/71 55/528 |
| 2006/0223405 A1 * | 10/2006 | Pourdeyhimi | D04H 3/14 442/361 |
| 2008/0022642 A1 * | 1/2008 | Fox | B01D 46/521 55/521 |
| 2008/0026172 A1 * | 1/2008 | Stelter | A41D 13/1146 428/221 |
| 2008/0120954 A1 | 5/2008 | Duello | |
| 2008/0166533 A1 * | 7/2008 | Jones | B29C 65/028 428/213 |
| 2008/0314010 A1 | 12/2008 | Smithies | |
| 2009/0044702 A1 * | 2/2009 | Adamek | B01D 46/546 55/486 |
| 2009/0076473 A1 * | 3/2009 | Kasai | A61F 13/15658 604/367 |
| 2009/0117803 A1 | 5/2009 | Jung | |
| 2009/0158697 A1 * | 6/2009 | Magee | B01D 46/0002 55/492 |
| 2009/0199715 A1 | 8/2009 | Koschak | |
| 2010/0101199 A1 | 4/2010 | Veeser | |
| 2010/0107881 A1 * | 5/2010 | Healey | B01D 46/522 55/486 |
| 2010/0119794 A1 | 5/2010 | Manstein | |
| 2010/0144228 A1 * | 6/2010 | Branham | D04H 1/728 977/773 |
| 2010/0159770 A1 * | 6/2010 | Walser | D04H 3/11 442/335 |
| 2010/0186595 A1 * | 7/2010 | Huang | B01D 39/12 96/226 |
| 2010/0192531 A1 | 8/2010 | Bao | |
| 2010/0247404 A1 | 9/2010 | Ptak | |
| 2010/0300054 A1 * | 12/2010 | Cole | B32B 5/08 156/60 |
| 2010/0305687 A1 | 12/2010 | Ajji | |
| 2010/0307503 A1 | 12/2010 | Iwamoto | |
| 2010/0313757 A1 | 12/2010 | Crabtree | |
| 2011/0036353 A1 * | 2/2011 | Kern | A62B 23/025 128/206.16 |
| 2011/0180478 A1 | 7/2011 | Shah | |
| 2012/0031063 A1 * | 2/2012 | Soyama | B01D 39/2024 55/527 |
| 2012/0171408 A1 * | 7/2012 | Turner | A44B 18/0011 428/88 |
| 2012/0187593 A1 | 7/2012 | Jung | |

(56) References Cited

U.S. PATENT DOCUMENTS

| | | | |
|---|---|---|---|
| 2012/0309249 A1* | 12/2012 | Von Bokern | D04H 1/54 442/329 |
| 2013/0197664 A1 | 8/2013 | Ballard | |
| 2013/0269529 A1 | 10/2013 | Jung | |
| 2013/0306548 A1 | 11/2013 | Kreibig | |
| 2014/0014572 A1 | 1/2014 | Mbadinga-Mouanda | |
| 2014/0202123 A1 | 7/2014 | Walz | |
| 2015/0047508 A1 | 2/2015 | Sanocki | |
| 2015/0061175 A1 | 3/2015 | Jung | |
| 2015/0128545 A1 | 5/2015 | Seeberger | |

FOREIGN PATENT DOCUMENTS

| | | |
|---|---|---|
| CN | 101617072 | 7/2012 |
| DE | 2801211 | 7/1978 |
| DE | 3916838 | 11/1990 |
| DE | 291932 | 7/1991 |
| DE | 4123122 A1 | 1/1993 |
| DE | 4217195 A1 | 11/1993 |
| DE | 3886199 | 4/1994 |
| DE | 4443158 A1 | 6/1996 |
| DE | 19618758 | 11/1997 |
| DE | 69322572 T2 | 12/1998 |
| DE | 69320027 T2 | 2/1999 |
| DE | 29907699 | 8/1999 |
| DE | 19920983 | 11/2000 |
| DE | 69914346 | 7/2001 |
| DE | 69331065 | 10/2001 |
| DE | 10026281 | 12/2001 |
| DE | 60100409 | 7/2003 |
| DE | 69628752 | 4/2004 |
| DE | 10310435 B3 | 6/2004 |
| DE | 10257833 A1 | 7/2004 |
| DE | 102004036440 A1 | 2/2005 |
| DE | 102004048291 | 4/2006 |
| DE | 102004060593 A1 | 6/2006 |
| DE | 102005026156 A1 | 12/2006 |
| DE | 102005055607 | 3/2007 |
| DE | 202007005847 U1 | 8/2007 |
| DE | 102006013170 A1 | 9/2007 |
| DE | 102007011365 | 9/2008 |
| DE | 102009026276 A1 | 2/2010 |
| EP | 0250005 A1 | 12/1987 |
| EP | 0109619 | 5/1988 |
| EP | 0330709 | 9/1989 |
| EP | 0379032 A1 | 7/1990 |
| EP | 0228512 | 1/1991 |
| EP | 0382330 | 1/1994 |
| EP | 0590307 A2 | 4/1994 |
| EP | 0674035 A2 | 9/1995 |
| EP | 0432586 B1 | 7/1996 |
| EP | 0537769 | 4/1998 |
| EP | 0867216 A1 | 9/1998 |
| EP | 0904819 | 3/1999 |
| EP | 0695383 | 10/2001 |
| EP | 1198279 B1 | 4/2002 |
| EP | 1637632 A1 | 3/2006 |
| EP | 1790406 A2 | 5/2007 |
| EP | 1970111 A1 | 9/2008 |
| EP | 1970111 B2 | 7/2010 |
| EP | 2752231 | 7/2014 |
| EP | 1866472 | 11/2016 |
| GB | 941082 | 11/1963 |
| GB | 2404347 A1 | 2/2005 |
| JP | S59141173 | 8/1984 |
| JP | H02264057 A | 10/1990 |
| JP | H03137909 | 6/1991 |
| JP | H0440206 A | 2/1992 |
| JP | H05321115 A | 12/1993 |
| JP | H06346310 A | 12/1994 |
| JP | H0813309 | 1/1996 |
| JP | 1997503958 | 4/1997 |
| JP | H09220427 | 8/1997 |
| JP | 2002219315 A | 8/2002 |
| JP | 2006341220 A | 12/2006 |
| JP | 2007170224 | 7/2007 |
| JP | 2007265778 A | 10/2007 |
| JP | 2009011887 | 1/2009 |
| JP | 2013052321 | 3/2013 |
| JP | 2014184360 | 10/2014 |
| JP | 2015107482 | 6/2015 |
| RU | 2188693 C2 | 11/2000 |
| RU | 2198718 C1 | 10/2001 |
| WO | 9216361 | 10/1992 |
| WO | 9216361 A1 | 10/1992 |
| WO | 9517943 | 7/1995 |
| WO | 9517944 | 7/1995 |
| WO | 9705306 | 2/1997 |
| WO | 0013765 | 3/2000 |
| WO | 01086043 | 11/2001 |
| WO | 03013732 A1 | 2/2003 |
| WO | 2004038078 | 5/2004 |
| WO | 2005060811 A1 | 7/2005 |
| WO | 2006002684 | 1/2006 |
| WO | 2006049664 A1 | 5/2006 |
| WO | 2005060696 A3 | 6/2006 |
| WO | 2007053204 A1 | 5/2007 |
| WO | 2007061457 | 5/2007 |
| WO | 2007061475 | 5/2007 |
| WO | 2007112877 A2 | 10/2007 |
| WO | 2008016771 A1 | 2/2008 |
| WO | 2007143243 A3 | 2/2009 |
| WO | 2011002878 | 1/2011 |
| WO | 2011133394 | 10/2011 |
| WO | 2012034679 | 3/2012 |
| WO | 2012069172 A2 | 5/2012 |
| WO | 2012097973 A1 | 7/2012 |

OTHER PUBLICATIONS

International Preliminary Report on Patentability dated Nov. 26, 2015 for Application No. PCT/EP2014/001290.
Lewandowski, Zbigniew et al., "The Nonwovens Formation in the Melt-blown Process" Fibres & Textiles in Eastern Europe, 2007.
Ward, Gregory, "Meltblown Nanofibres for Nonwoven Filtration Applications" Filtration+Separation, Nov. 2001.
I. M. Hutten, Handbook of Nonwoven Filter Media, pp. 195-203, 2007.
First Examination report from the India Intellectual Property Office, dated Mar. 13, 2015, 2 pages.
Office Action in corresponding Japanese application 362967 dated Aug. 11, 2015.
Office Action in corresponding German Application 102006014236.5 dated Jun. 19, 2015.
Hutten, Irwin M., "Handbook of Nonwoven Filter Media", 2007, 12 pages.
International Search Report for application PCT/EP2007/002650 dated Jan. 16, 2008.
International Search Report and Written Opinion dated Jul. 4, 2012 corresponding to PCT/EP2011/005854.
International Search Report for PCT/EP2013/001463 dated Jun. 25, 2014.
International Preliminary Report on Patentability dated Dec. 8, 2014 corresponding to PCT/EP2013/001634.
Examination Report dated Mar. 10, 2015 in corresponding German application No. 10 2012 011 065.0.
International Search Report for PCT/EP2014/001290 date Mar. 31, 2014.
Ntemation Search Report and Written opinion for PCT/TH2015/000082 dated Mar. 12, 2016.
Borealis Brochure; Borealis Polypropylene for Nonwoven Applications; 2004.
Kathryn C. Dutton; Overbiew and Analysis of the Matblown Process and Parameters; Journal of Textile and Apparel,Technology and Management; vol. 6 Issue 1; Fall 2008; pp. 1-25.
Meltblown Nanofibres for Nonwovan Filtration Appilcations Filtration+Separation; Nov. 2001.
Office Action in corresponding Japanese application 2017-547373 dated Sep. 2, 2019.

(56) References Cited

OTHER PUBLICATIONS

First examination report in corresponding German application No. 10 2013 008 402.4 dated Nov. 22, 2021.

\* cited by examiner

FIBROUS NONWOVEN AND METHOD FOR THE PRODUCTION THEREOF

FIELD OF THE INVENTION

The invention relates to a nonwoven fabric, particularly for a filter medium, comprising at least one fiber strand having at least one first section and one second section in the longitudinal direction.

BACKGROUND OF THE INVENTION

Nonwoven fabrics of this type are used in filter media, e.g. for air filters or air conditioning system filters, particularly however for air filters for motor vehicle interiors or engine filters.

Nonwoven fabrics are usually produced in a primary forming process, particularly a melt-spinning process such as, for example, a spun-bond or a melt-blown process as described e.g. in DE 41 23 122 A1.

The intake air of internal combustion engines, for example in motor vehicles or in off-road applications, is normally filtered to protect the engine's combustion chamber from mechanical damage due to particles sucked in from the surrounding air. An important design criterion for the elements is ensuring long filter service life along with concurrently high effective filtration of ingested particles.

Then again, however, motor vehicles have a precisely calculated energy distribution system. Only limited amounts of energy are provided for heating/ventilation/cooling, particularly in the case of electric vehicles. Due to ever stricter exhaust regulations, these energy quantities continually need to be markedly reduced, particularly also in the case of electric vehicles in which, to the greatest extent possible, mechanical energy is only to be expended for propulsion. There are also narrow limits governing the costs of vehicle components. On the other hand, vehicle buyers are continually demanding greater comfort and safety. From these perspectives, particle filters having the lowest possible loss or pressure differential are of special significance as the fan motor only needs to generate a lower pressure, with energy consumption consequently being less. Moreover, due to the lesser amount of power required, they also run more quietly which reduces noise and thus considerably increases driving comfort.

The demand for filter systems having low pressure differentials competes with the required filtration efficiency and the required service life; i.e. the amount of time expressed in mileage which a filter can remain in the vehicle before needing to be replaced. For example, pollen filters which only filter pollen out of the air flowing into the vehicle are not enough for vehicle interiors. The allergens which cause the immune system to react are proteins having diameters of only a fraction of the diameter of pollen. They are in the 0.1 µm size range; i.e. the range which is most problematic for particle filters, the so-called MPPS (Most Penetrating Particle Size) range. Correspondingly, the filtration efficiency at this size should be at least 50%, whereby this is measured by means of an aerosol having particles of roughly the same size as the particles to be filtered, e.g. sodium chloride. At the same time, the service life of such filters installed into motor vehicles should be at least 30,000 kilometers.

In common filters, e.g. ring filters or frame filters, the nonwoven filter medium has a zigzag folding; i.e. is pleated in order to increase the surface of the filter medium per unit of filter area. So that the filter medium will be pleatable, it needs to have a certain rigidity. A certain rigidity to the filter medium is also desirable in the pleated state to prevent the individual folds of the pleating from collapsing on top of each other upon the inflow of air to be filtered.

Different methods are known from the prior art for increasing the rigidity of a filter medium. It is for example known to provide a filter medium with a texturing to effect reinforcement of the material due to its three-dimensional structure.

Using bicomponent fibers which combine the properties of two different polymers in one nonwoven fabric is furthermore known. A nonwoven fabric having high-strength tear-resistant component fibers is for example disclosed in EP 1 866 472 B1.

Known nonwoven fabrics of increased rigidity thereby have the disadvantage on the one hand of only being able to be manufactured at increased expenditure and/or the rigidity only being able to be increased by subsequent processing of the nonwoven fabric.

BRIEF SUMMARY OF THE INVENTION

The invention is therefore based on the task of providing a nonwoven fabric of increased rigidity which can be easily and economically produced, particularly on already existent apparatus.

This task is solved according to the invention by a nonwoven fabric and a method for producing a nonwoven fabric.

Inventive thickenings act as structural reinforcements of the nonwoven fabric, contributing to the increase in the nonwoven fabric's rigidity. The nonwoven fabric thereby becomes better pleatable and also keeps its surface form better. Individual pleats of a filter thereby do not collapse or fall onto each other upon inflow of air to be filtered and thus a large filter surface is maintained.

A nonwoven fabric as defined by the invention is a nonwoven material in which strands of fibers are deposited on top of each other in a primary forming process and bond into a nonwoven. If necessary, hardening takes place in a further step by means of calendering, thermobonding, hot-air and/or ultrasonic welding.

A fiber strand in the sense of the invention is formed by one or more fibers, wherein the fiber(s) have no interruption in the longitudinal direction, are therefore of one piece.

A thickening in the sense of the invention is an enlargement of the fiber strand's diameter and/or circumference.

A crimping in the sense of the invention is a twisting in the fiber strand itself and is preferably characterized as the so-called crimp. To determine same, one needs the length of the fiber in the crimped and stretched state and a determination of the tensile force thereby required. Such a determination can in particular be made pursuant DIN 53840.

A fiber bundle in the sense of the invention consists of a plurality of fiber strands.

A polymer in the sense of the invention is a pure polymer or a polymer mixture comprising at least concentrations of two polymers as components. Preferably, other substances or impurities can also be components of the polymer mixture. These particularly exhibit a characteristic distribution in molecular chain length and/or a characteristic molecular structure.

Air permeability as defined by the invention is that volume per square meter which flows through a nonwoven fabric at preferably 200 Pa inflow pressure per second.

Filtration efficiency as defined by the invention is determined by NaCl particles, particularly 0.3 to 0.5 µm in size and preferably pursuant to DIN 71460-1, at an inflow velocity of preferably 0.14 m/s.

Mass distribution in the sense of the invention is the mass per unit area and is preferably determined pursuant to DIN EN 29073-1.

Average pore size in the sense of the patent is preferably determined based on the bubble point test according to the ASTM D6767, ASTM F316-0 and/or ISO 2942, ISO 4003 standards, particularly with the Topas PSM 165 measuring device.

Viscosity in the sense of the invention is a measure of a fluid's thickness. The higher the viscosity, the more resistant the fluid is to flow (less capable of flow); the lower the viscosity, the less resistant it is (more capable of flow), can thus flow faster under the same conditions. One measure of the viscosity of a plastic melt is the melt flow index which is indicated as the melt volume-flow rate and/or the melt mass-flow rate. In accordance with the invention, viscosity is preferably determined according to the common test procedures of the DIN EN ISO 1133-1:2011 standard. According to the invention, the conditions for determining the melt flow rate of thermoplastic materials are preferably defined pursuant to the following international standards:

| Materials | International standard |
|---|---|
| ABS | ISO 2580 |
| ASA, ACS, AEDPS | ISO 6402 |
| E/VAC | ISO 4613 |
| MABS | ISO 10366 |
| PB[a] | ISO 8986 |
| | ISO 15494 |
| | ISO 15876 |
| PC | ISO 7391 |
| PE[a] | ISO 1872 |
| | ISO 4427 |
| | ISO 4437 |
| | ISO 15494 |
| | ISO 22391 |
| PMMA | ISO 8257 |
| POM | ISO 9988 |
| PP[a] | ISO 1873 |
| | ISO 15494 |
| | ISO 15874 |
| PS | ISO 1622 |
| PS-I | ISO 2897 |
| SAN | ISO 4894 |

[a]melt density values for this materialmay be included in thematerial standard.

Preferential embodiments are claimed in the subclaims.

Preferably, the viscosity of the first polymer or first polymer mixture respectively at 230° C. and a pressure of 2.16 kg amounts to approximately 200-1200 ccm/10 min, preferentially approximately 300-800 ccm/10 min, most preferentially approximately 400-700 ccm/10 min.

Preferably, the viscosity of the second polymer at 230° C. and a pressure of 2.16 kg amounts to approximately 5-80 ccm/10 min, preferentially 10-50 ccm/10 min, preferentially 12-30 ccm/10 min, more preferentially 14-20 ccm/10 min and most preferentially 17 ccm/10 min.

In one preferential embodiment, the diameter of a thickening at its widest point in relation to the average diameter of the fiber strand in the at least one first fiber section amounts to at least 3:1, preferentially at least 2:1, preferentially at least 1.7:1 and most preferentially at least 1.5:1.

In a further preferential embodiment, the fiber strand in the first fiber section has an average diameter of approximately 0.5-20 μm, preferentially approximately 1-9 μm, preferentially approximately 3-6 μm and most preferentially approximately 5 μm.

In a further preferential embodiment, the diameter of the thickening at its widest point in relation to the longitudinal elongation of the thickening of the at least one integral fiber strand amounts to approximately 0.5:1 to 1:1, preferentially approximately 1:1 to 2:1 and most preferentially approximately 2:1 to 4:1.

In a further preferential embodiment, the thickening exhibits a crimping of the fiber strand. The crimping in particular hereby forms the thickening. The crimping reinforces the relative fiber strand in the second section, particularly due to the interaction between individual swirls of the fiber strand.

In a further preferential embodiment, the thickening comprises at least one crimping and/or at least one fiber bundle. The crimping and/or fiber bundle results in not only the individual fiber strands themselves being reinforced but also cooperatively reinforcing adjacent fiber strands.

In one preferential embodiment, the thickening exhibits entwined fiber strand loops. The interaction of individual fiber strand loops also results in reinforcing the nonwoven fabric. Alternatively, the loops of multiple fiber strands can also be entwined.

In a further preferential embodiment, the thickening exhibits an area in which the fiber strand rests upon itself and is preferentially at least partially fused in said area. The fusing of adjacent areas also increases the rigidity of the nonwoven fabric.

In a further preferential embodiment, the first fiber section is substantially of a first polymer or First polymer mixture and the second fiber section is substantially of a second polymer or second polymer mixture, whereby the second polymer has a higher viscosity than the first polymer.

Selecting different polymers for the fiber strand sections can achieve different material properties for the individual sections. A suitable material selection can intensify the increased rigidity afforded by the thickenings. Furthermore, suitably selecting the material for the second section can, as applicable, give rise to thickening seven forming in the first place.

In a further preferential embodiment, the percentage of the second polymer in the nonwoven fabric amounts to 2-20% by weight, preferentially 5-15% by weight and most preferentially 10% by weight. These percentages have proven to be particularly advantageous for reinforcing the nonwoven fabric. Preferably, the second polymer or second polymer mixture respectively is not homogeneously mixed with the first polymer or first polymer mixture.

In a further preferential embodiment, the second fiber section adjoins the first fiber section and the integral fiber strand comprises a third fiber section adjoining the second fiber section and having a structure substantially identical to the first fiber section.

Again changing the polymer composition in the third fiber section gives the fiber section a macrostructure which is substantially identical to that of the first fiber section and therefore exhibiting substantially no tangling and/or thickenings.

In a further preferential embodiment, the first layer has a mass distribution of approximately 25-45 g/m$^2$, preferentially approximately 30-40 g/m$^2$ and most preferentially approximately 35 g/m$^2$ and/or a thickness of approximately 0.4 mm to approximately 0.7 mm, preferentially approximately 0.5 mm to approximately 0.6 mm and most preferentially approximately 0.55 mm.

It has been determined that particularly good particulate matter storage capacity and/or particularly good filtration efficiency is imparted to the first layer at these parameter values.

In a further preferential embodiment, the first layer has an average of approximately 2 to 10, preferentially approximately 4 to 8 thickenings/cm$^2$, particularly preferentially approximately 5 to 7 thickenings/cm$^2$ and most preferentially approximately 6 thickenings/cm$^2$.

Good stabilization of the first layer or filter medium respectively at only slightly lesser filtration efficiency has been determined at these thickening concentrations.

In a further preferential embodiment, the first layer exhibits an air permeability of approximately 5000-7000 l/(m$^2$s), preferentially approximately 5500-6500 l/(m$^2$s) and most preferentially approximately 6000 l/(m$^2$s), and/or a filtration efficiency of approximately 10-20% and preferentially approximately 15%.

These parameter values are particularly well suited to utilizing the filter medium as an air filter, particularly in a motor vehicle.

In a further preferential embodiment, the filter medium additionally comprises a second layer, the pore size of which is on average substantially smaller than that of the first layer.

Further stabilization of the filter medium is achieved by this second layer. This second layer can furthermore prefilter coarse dust particles.

In a further preferential embodiment, the second layer has a mass distribution of approximately 45-75 g/m$^2$, preferentially approximately 50-70 g/m$^2$, particularly preferentially approximately 55-65 g/m$^2$ and most preferentially approximately 60 g/m$^2$, and/or a thickness of approximately 0.5-0.9 mm, preferentially approximately 0.6-0.8 mm and most preferentially approximately 0.7 mm.

It has been determined that particularly good particulate matter storage capacity and/or particularly good filtration efficiency is imparted to the second layer at these parameter values.

In a further preferential embodiment, the second layer exhibits an air permeability of approximately 3000-4000 l/(m$^2$s), preferentially approximately 3250-3750 l/(m$^2$s) and most preferentially approximately 3500 l/(m$^2$s), and/or a filtration efficiency of approximately 10-25%, preferentially approximately 15-20% and most preferentially approximately 17.5%.

These parameter values are particularly well suited to utilizing the filter medium as an air filter, particularly in a motor vehicle.

In a further preferential embodiment, the filter medium additionally comprises a third layer, the pore size of which is on average substantially smaller than that of the second layer and which is preferentially arranged on the far side of the first layer from the second layer.

Since its material has a high static charge capacity, this layer is particularly well-suited to being used as an electret filter layer in the filter medium.

In a further preferential embodiment, the third layer has a mass distribution of approximately 35-60 g/m$^2$, preferentially approximately 40-55 g/m$^2$, particularly preferentially approximately 45-50 g/m$^2$ and most preferentially approximately 47.5 g/m$^2$, and/or a thickness of approximately 0.4-0.7 mm, preferentially approximately 0.5-0.6 mm and most preferentially approximately 0.55 mm.

It has been determined that particularly good particulate matter storage capacity and/or particularly good filtration efficiency is imparted to the third layer at these parameter values.

In a further preferential embodiment, the third layer exhibits an air permeability of approximately 800-1300 l/(m$^2$s), preferentially approximately 900-1200 l/(m$^2$s) and most preferentially approximately 1000 l/(m$^2$s), and/or a filtration efficiency of approximately 40-80%, preferentially approximately 50-70% and most preferentially approximately 60%.

These parameter values are particularly well suited to utilizing the filter medium as an air filter, particularly in a motor vehicle.

In a further preferential embodiment, the three layers together have a mass distribution of approximately 105-180 g/m$^2$, preferentially approximately 120-160 g/m$^2$ and most preferentially approximately 140 g/m$^2$, and/or a thickness of approximately 1.2-2.5 mm, preferentially approximately 1.3-2.3 mm, particularly preferentially approximately 1.5-2.1 mm, more preferentially approximately 1.7-1.9 mm and most preferentially approximately 1.8 mm.

It has been determined that these parameter values impart particularly good particulate matter storage capacity and/or particularly good filtration efficiency to the three-layer filter medium.

In a further preferential embodiment, the three layers together exhibit an air permeability of approximately 500-1300 l/(m$^2$s), preferentially approximately 600-1200 l/(m$^2$s), particularly preferentially approximately 800-1000 l/(m$^2$s) and most preferentially approximately 900 l/(m$^2$s).

These parameter values are also particularly well suited to the use of the filter medium as an air filter, particularly in a motor vehicle.

The method according to the invention has the advantage of being able to produce sections of a fiber strand, so-called fiber sections, of different structures in the primary forming process without any subsequent processing of the fiber strands or nonwoven fabric being required. Different layers of a nonwoven fabric having varying structures can also be produced simultaneously in one single primary forming process. This is not possible when structural changes in a layer cannot be made until subsequent processing since each further layer can then only be applied in a further primary forming process.

Further enabled is that fiber strands having multiple structures can be integrally formed by changing the parameters. If the obtaining of other similar structures is provided by partially or temporarily introducing fiber strands, they would thus form drops, so-called shots, at their beginning and end which would lead to reducing the quality of the nonwoven fabric, particularly the particulate matter storage capacity.

In one preferential embodiment, at least two polymers are mixed to produce the first polymer melt such that the polymers in the first polymer melt are preferably inhomogeneously distributed.

Providing areas in the polymer melt in which different polymers dominate produces fiber strands having fiber sections of differing material structures when the polymer melt discharges from a spinning beam in the primary forming process. Preferably, granulate clusters of a second polymer or polymer mixture thereby homogeneously mix with the granulates of a first polymer or polymer mixture. When this mixture is melted, islands of the second polymer/polymer mixture form in the melt, making the first polymer/polymer mixture inhomogeneous.

In a further preferential embodiment, at least one of the polymers, particularly the first polymer, is in the melted state when mixed.

By mixing the second polymer into the melted first polymer or vice versa, individual areas can be produced in the melted first "main polymer" in which the respective mixed-in second polymer predominates. An inhomogeneous mixing of polymer areas can thus be achieved, however with a homogeneous arrangement of the respective areas.

In accordance with the invention, multiple embodiments of the invention described above can also be—where technically expedient—combined at will.

BRIEF DESCRIPTION OF THE SEVERAL VIEWS OF THE DRAWING(S)

Reference will be made to the drawings in the following description of preferential embodiments in specifying the above as well as further advantages, features and possible applications of the present invention. The drawings depict the following:

FIG. 2b is a partial schematic representation of the electron microscope image according to FIG. 2a;

FIG. 3b is a partial schematic representation of the electron microscope image according to FIG. 3a;

FIG. 4b is a partial schematic representation of the electron microscope image according to FIG. 4a;

FIG. 5b is a partial schematic representation of the electron microscope image according to FIG. 5a;

DETAILED DESCRIPTION OF THE INVENTION

Figure 1:
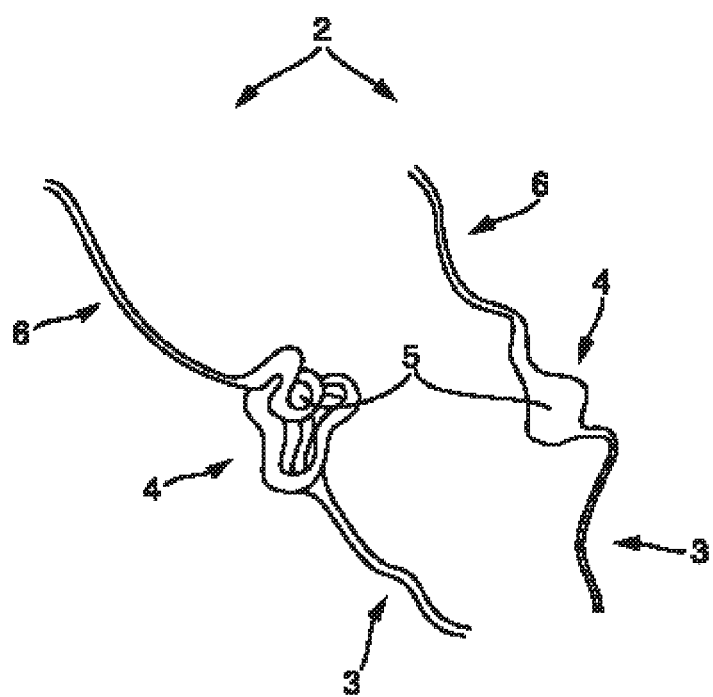
FIG. 1 is a partial schematic representation of two fiber strands having a nonwoven fabric thickening in accordance with the present invention.

FIG. 1 shows two fiber strands 2 of a nonwoven fabric 1 according to the invention, each exhibiting a thickening 5. Each fiber strand 2 can be divided into three fiber sections 3, 4 and 6. A first fiber section 3 extends from the one end of the fiber strand to the area of the thickening 5. A second fiber section 4 comprises the thickening 5 as well as preferably the area right in front and right in back of the thickening 5. Preferably, the second fiber section 4 can also be formed solely by a thickening 5. The third fiber section 6, which has a similar or even identical material structure as the first fiber section 3, adjoins the second fiber section 4. A second fiber section 4 having a further thickening 5 can in turn also adjoin the third fiber section 6, whereby the length of the fiber strand 2 is theoretically unlimited.

As FIG. 1 indicates, the thickening 5 can exhibit entwined loops in the fiber strand 2 or also constitute solely a thickening of the fiber strand 2. Preferably, the thickening 5 is formed by a crimping of the fiber strand 2, further preferable is for sections of a fiber strand to abut in the area of the thickening, wherein these areas are at least partially fused. It is further preferable for the thickenings 5 to comprise fiber bundles 7 of a plurality of adjoining fiber strands 2. Such a fiber bundle 7 can, however, preferably also consist of just one fiber strand 2, whereby the fiber Strand 2 forms substantially parallel loops. It is further preferable for the first fiber section 3 and the second fiber section 4 to consist of different polymers. Preferably, the second polymer has a higher viscosity than the first polymer. Various polymers are hereby further preferable, also two polymers with the same structural formula but different characteristic molecular chain length distributions. This supports the forming of a thickening in the second section, as is described in detail with reference to FIG. 5.

Figure 2A:
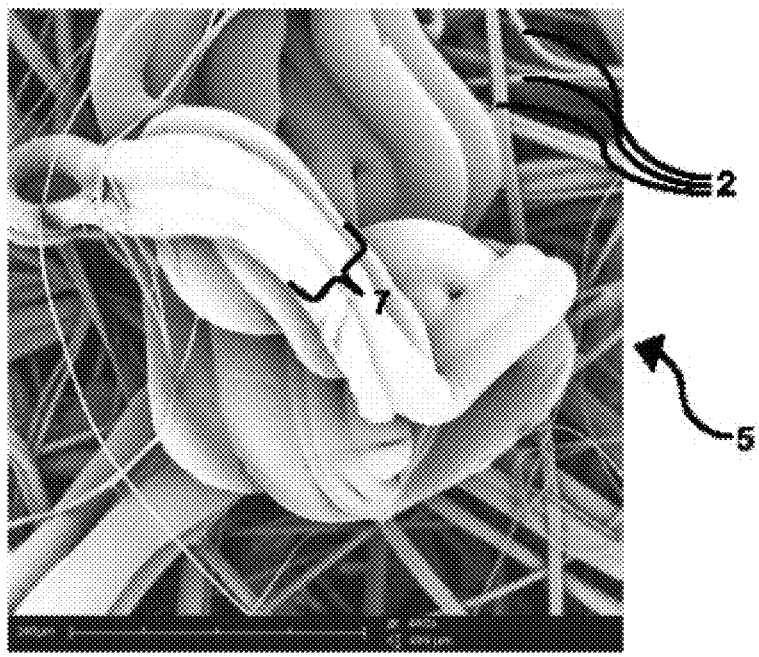
FIG. 2a is an electron microscope image of a nonwoven fabric according to the present invention.
Figure 2B:
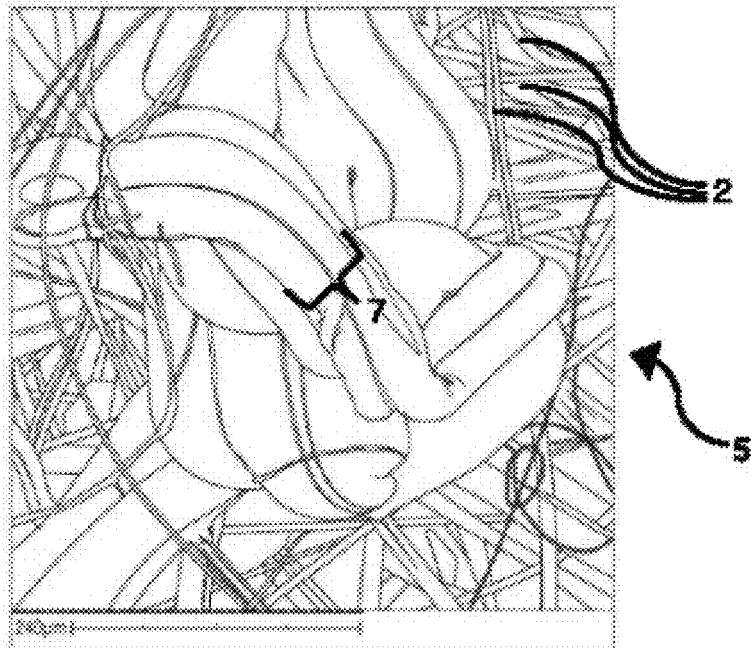

FIGS. 2a and 2b show an electron microscope image of a thickening 5 arranged in a nonwoven fabric 1. It is clearly recognizable that the fiber strand 2 is conjoined in the area of the thickening 5, partly forming fiber bundle 7 and partly twisted into loops. Regions adjacent to fiber strand 2 in the area of the thickening 5 are in part fused together.

Figure 3A:
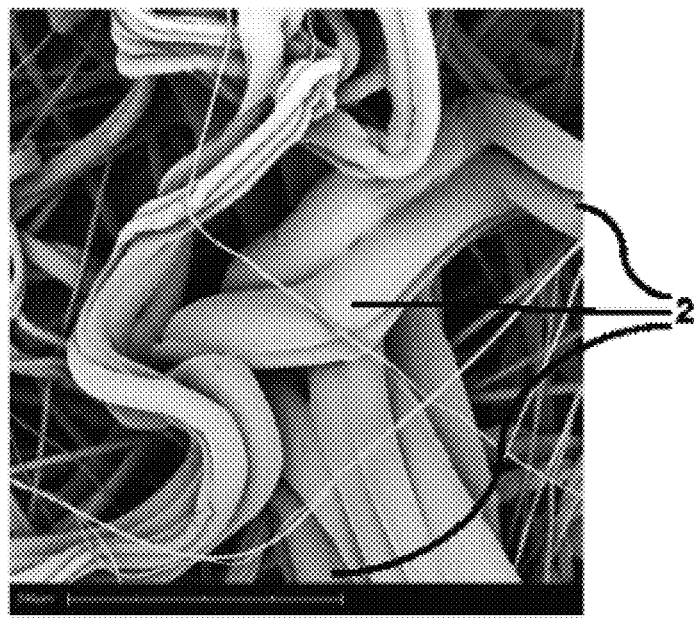
FIG. 3a is a further electron microscope image of a nonwoven fabric according to the present invention.
Figure 3B:
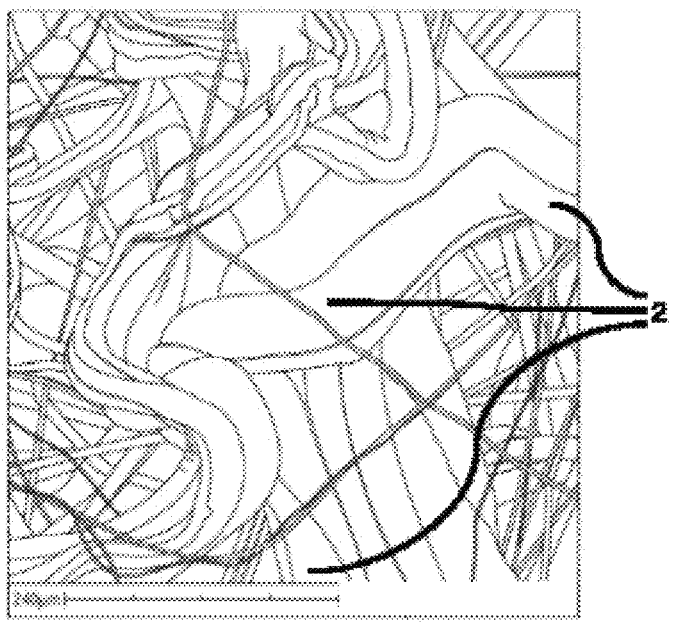

FIGS. 3a and 3b show a further electron microscope image of a thickening 5 arranged in a nonwoven fabric 1. Clearly recognizable is the increased fiber thickness or fiber diameter respectively of the fiber strand identified as "2" compared to the lower right edge of the image where the fiber strand 2 continues on.

Figure 4A:
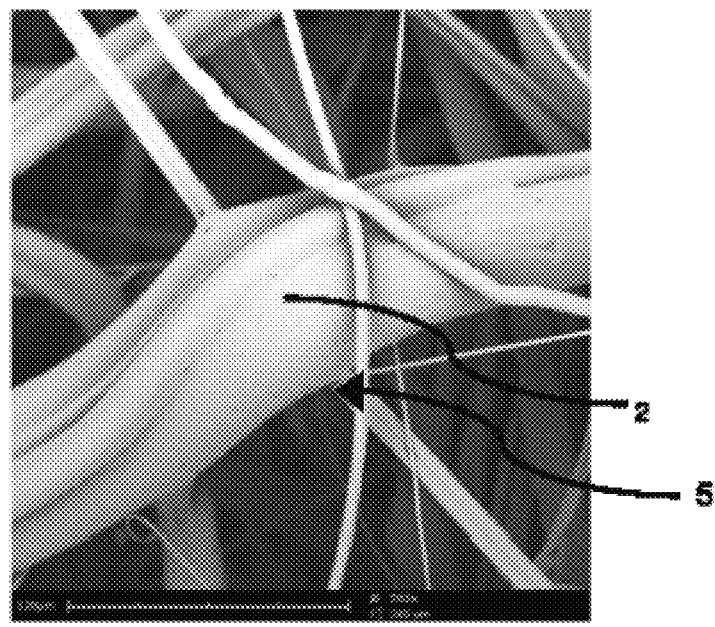
FIG. 4a is a further electron microscope image of a nonwoven fabric according to the present invention.
Figure 4B:
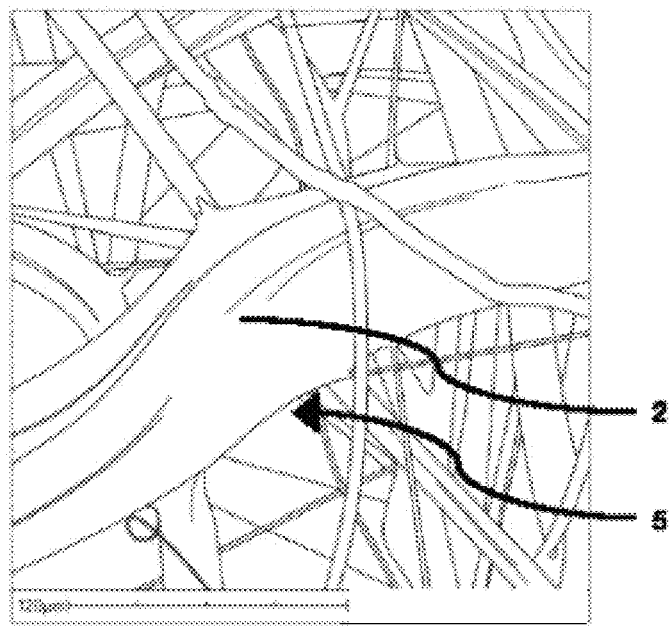

FIGS. 4a and 4b show a further electron microscope image of a thickening 5 arranged in a nonwoven fabric 1. It is clearly recognizable that the individual fibers of the fiber strand 2 are fused together in the thickening 5 in the area of the latter.

Figure 5A:
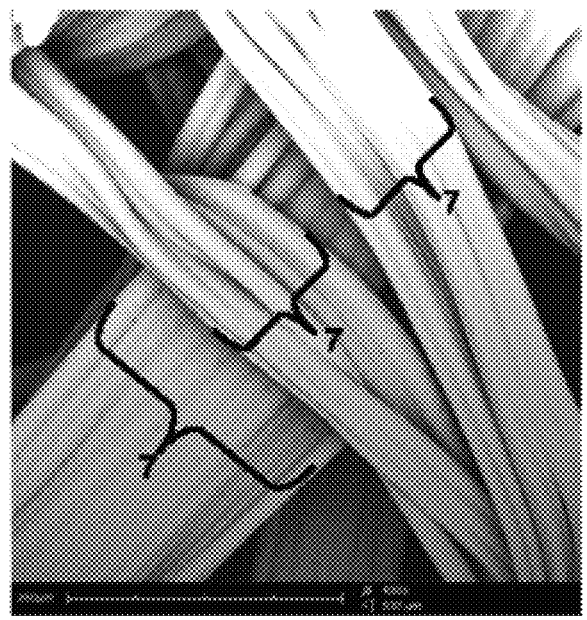
FIG. 5a is a further electron microscope image of a nonwoven fabric according to the present invention.
Figure 5B:
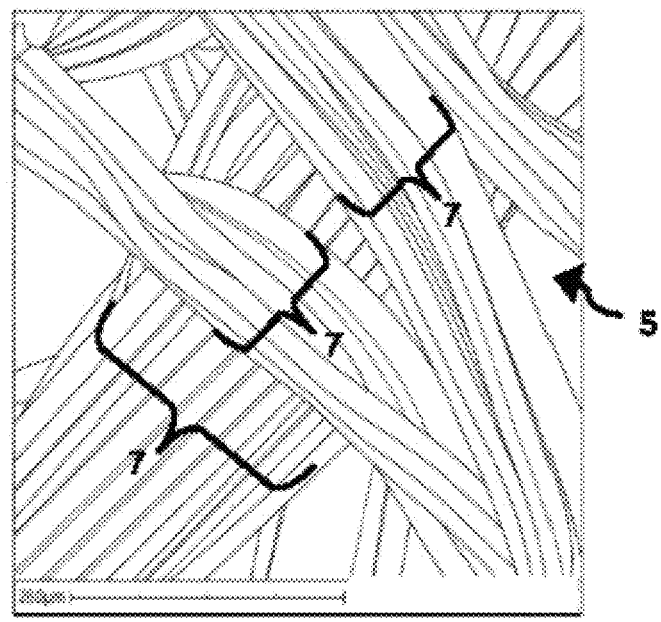

FIGS. 5a and 5b show a further electron microscope image of a thickening 5 arranged in a nonwoven fabric 1 and which is in particular formed by fiber bundles 7.

Figure 6:
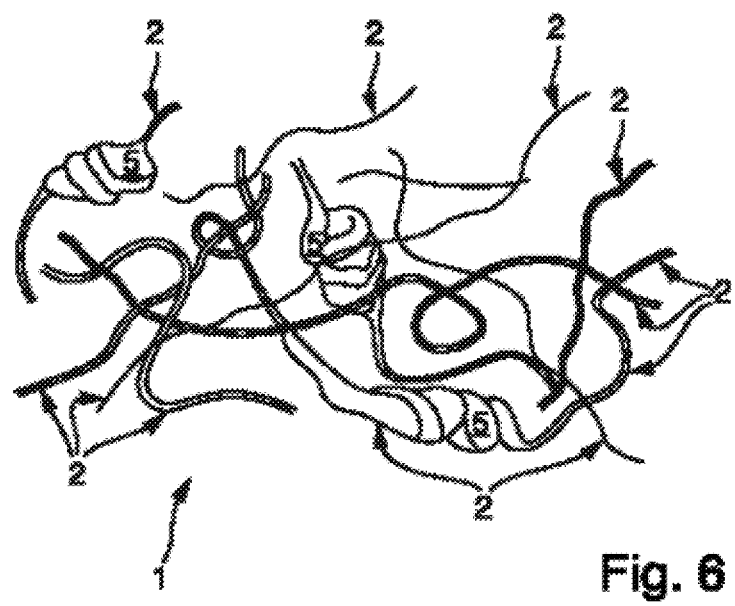
FIG. 6 is a partial schematic representation of a nonwoven fabric having a plurality of thickenings in accordance with the present invention.

FIG. 6 is a schematic depiction of a nonwoven fabric 1 in accordance with the present invention. The nonwoven fabric 1 consists of a plurality of fiber strands 2. Some of the fiber strands 2 have thickenings formed by fiber bundles 7, by an increased fiber thickness, by crimping and/or by loops. Preferably, the thickenings exhibit a combination of thickenings, fiber bundles, crimps and/or loops.

As a rule, fiber strands 2 do not end in thickenings 5; instead, a fiber strand 2 with a thickening 5 continues on in a first fiber section 3 and a third fiber section 6 on both sides of the second fiber section 4. This differentiates the thickenings particularly from so-called shots which form in a nonwoven fabric when the fiber strand 2 tears off during the manufacturing process. Since the thickenings 5 are part of the fiber strands 2, good filtration efficiency to the nonwoven fabric 1 is maintained despite the accumulation of fiber strand-forming polymer at the site of a thickening 5.

This is attributable to the fact that the surface area of the thickenings 5 can also absorb particles to be filtered.

A nonwoven fabric 1 in accordance with the invention achieves better filtration efficiency than a material reinforced with a second fiber or a bicomponent fiber having similar rigidity values as the inventive nonwoven fabric 1.

Figure 7:
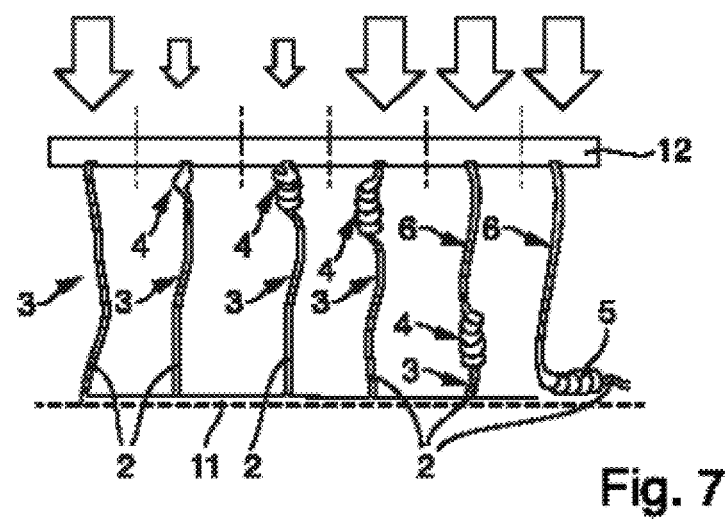
FIG. 7 is a partial schematic representation of the manufacturing process according to a first embodiment of the present invention.

FIG. 7 schematically depicts a method for manufacturing an inventive nonwoven fabric 1 in a melt-blown or spunbond process. The spinning beam 12 is hereby respectively depicted on a nozzle for discharging a polymer at different times which proceed chronologically consecutively from left to right.

A polymer is first discharged from the spinning beam 12 under pressure. The dispersed polymer is drawn out by means of a process airflow circulating above the spinning beam 12, indicated in FIG. 7 by an arrow, and conveyed to the substrate 11 on which the resulting fiber strand 2 deposits. In a next step, the intensity of the process airflow is reduced. The fiber strand 2 thickens at the nozzle of the spinning beam 12 since the polymer is only being removed or dispersed more slowly (weaker process airflow indicated by the small arrow). A first section 3 of substantially homogeneous structure and a second section 4 gradually forming a thickening 5 is thus produced on the fiber strand 2. The intensity of the airflow is then increased again at a specific time, whereby the removal of the polymer sprayed or extruded through the spinning beam 12 increases again. A third section 6 of material structure resembling or even identical to the first section 3 is thereby formed in fiber strand 2.

Lastly, as depicted on the far right in FIG. 7, the thickening 5 deposits on the substrate 11. The substrate 11 is preferably in motion during the entire process such that the fiber strand 2 is deposited successively on the substrate 11. Preferably, the fiber strand 2 does not separate from the spinning beam 12 or the respective spray nozzle for the duration of forming a thickening 5 so that a continuous fiber strand 2 will result.

Figure 8:
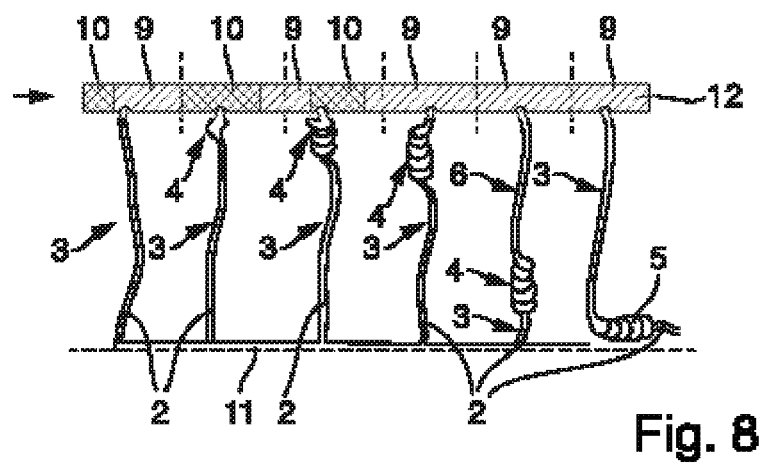
FIG. 8 is a partial schematic representation of a manufacturing process according to a second embodiment of the present invention.

FIG. 8 depicts the manufacturing process for an inventive nonwoven fabric 1 according to a second embodiment. The chronological sequence of actions at a nozzle of a spinning beam 12 is again depicted from left to right. The manufacturing method according to FIG. 8 essentially differs from the manufacturing method according to FIG. 7 by the fact of the process airflow remaining constant while the viscosity of the polymer, however, changes. Preferably, different polymers or polymer mixtures are introduced into the spinning beam 12 in succession to form areas of a first polymer 9 and areas of a second polymer 10 in the spinning beam. The first polymer 9 thereby forms a first fiber section 3 or a third fiber section 6 of a fiber strand 2 when sprayed out of the spinning beam 12. The second polymer 10 forms a second section 4 of a fiber strand 2 when sprayed out of the nozzle in which thickenings 5 form in a first layer 12 of the nonwoven fabric when deposited on the substrate.

The thickenings 5 form due to the fact of the second polymer 10 having a higher viscosity than the first polymer 9, which is why the process airflow cannot draw it out so easily. It therefore remains longer in the area of a spinneret of the spinning beam 12 and accumulates there into a structure corresponding to a third section 4, which eventually forms a thickening 5.

Alternatively or additionally to different polymers 9, 10, the process temperature and/or process air speed at the spinning beam 12 or the spinnerets of the spinning beam 12 respectively can preferably also be varied so as to affect the viscosity of a single polymer in order to respectively form the first section 3, second section 4 and third section 6.

Figure 9:
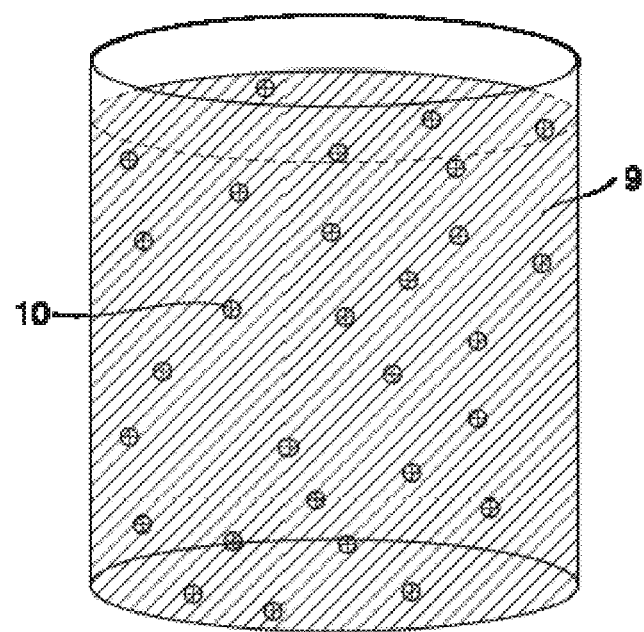
FIG. 9 is a partial schematic representation of a polymer melt for the manufacturing process in accordance with the second embodiment of the invention according to FIG. 8.

FIG. 9 shows a container of polymer melt used in producing an inventive nonwoven fabric 2 in accordance with the embodiment of FIG. 5. Areas having the second polymer and/or polymer mixture 10 are thereby introduced into the melt of a first polymer and/or polymer mixture 9. The individual granules of the second polymer/polymer mixture 10 being introduced into the polymer granulates of the first polymer/polymer mixture 9 thus enables the polymers to be mixed in a solid state. Further preferably, such a mixing can be achieved by polymer granulates of the second polymer 10 being introduced into a melt of the first polymer 9. Further preferably, different polymers 9, 10 can also be introduced into the respective nozzle 9 of a spinning beam 12 through different feed lines.

The percentage of the higher-viscosity polymer in the melt typically amounts to 2-20% by weight (weight percent), preferentially 5-15% by weight and most preferentially 10% by weight.

Applicable polymers for producing a nonwoven fabric 1 in accordance with the invention include for the first polymer 9 preferably synthetic polymers, particularly polyesters, selected from among the group consisting of polyethylene (PE), polyethylene terephthalate (PET), polycarbonate (PC), polyamide (PA), polypropylene (PP), polyvinylchloride (PVC), polybutylene terephthalate (PBT) and mixtures thereof. Applicable with respect to the second polymer 10 are preferably synthetic polymers selected from among the group consisting of polyethylene (PE), polyethylene terephthalate (PET), polycarbonate (PC), polyamide (PA), polypropylene terephthalate (PPT), polypropylene (PP), polyester, polyvinyl chloride (PVC), polybutylene terephthalate (PBT) and mixtures thereof. Any combination of the first polymer 9 and the second polymer 10 can be used. Furthermore, mixtures of different polymers as above or others can preferably be used for the first polymer 9 as well as for the second polymer 10.

Preferable suitable combinations of a first polymer 9 and second polymer 10 are as follows: PET and PC, PET and PA, PET and PP, PET and PE, PET and PVC, PET and PBT, PC and PA, PC and PP, PC and PE, PC and PVC, PC and PBT, PA and PP, PA and PE, PA and PVC, PA and PBT, PP and PE, PP and PVC, PP and PBT, PE and PVC, PE and PBT, or PVC and PBT.

Further preferably suitable combinations are as follows: PBT and PVC, PBT and PE, PBT and PP, PBT and PA, PBT and PC, PBT and PET, PVC and PE, PVC and PP, PVC and PA, PVC and PC, PVC and PET, PE and PP, PE and PA, PE and PC, PE and PET, PP and PA, PP and PC, PP and PET, PA and PC, PA and PET, or PC and PET.

Two polymers having the same structural formula but different characteristic distribution in molecular chain length are also particularly suitable as the first polymer 9 and second polymer 10. Polymer compositions of the above-cited polymers are likewise suitable as the first polymer 9 and/or the second polymer 10.

Lastly, as illustrated with reference to the preceding figures, the nonwoven fabric 1 can also be produced from just one single polymer and/or just one single characteristic molecular chain length from this group.

It is also possible to combine the manufacturing processes 8 presented in FIGS. 7 and 8. Further preferably, the different sections 3, 4 and 6 of a fiber strand 2 can be formed by varying the polymer flow rate through the nozzles of the spinning beam 12, for example by changing the spinning beam 12 spray pressure. This procedure can also be combined with the previous procedures.

A first layer 12 of a nonwoven fabric 5 produced in this manner preferably has a mass distribution of approximately 25-45 g/m², preferentially approximately 30-40 g/m² and most preferentially approximately 35 g/m², and further preferably a thickness of approximately 0.4 mm to approximately 0.7 mm, preferentially approximately 0.5 mm to approximately 0.6 mm and most preferentially approximately 0.55 mm. Said first layer 12 further preferably has an average of approximately 2 to 10 thickenings/cm², preferentially approximately 4 to 8 thickenings/cm², particularly preferentially approximately 5 to 7 thickenings/cm² and most preferentially approximately 6 thickenings/cm². The air permeability of said first layer 12 preferably amounts to approximately 5000-7000 l/(m²s), preferentially approximately 5500-6500 l/(m²s) and most preferentially approximately 6000 l/(m²s). The filtration efficiency preferably amounts to approximately 10-20% and preferentially approximately 15%. The inventive effect can also be achieved at the peripheries of the respective range specifications. Additionally, all the cited parameter values are average values which can deviate significantly at individual locations within the first layer 12.

The first layer 12 preferably has an average pore size pursuant to the bubble point test of greater than 80-100 µm. The first fiber section 3 and/or the third fiber section 6 further preferably have an average thickness of 10-40 µm, preferentially 20-30 µm and most preferentially 25 µm. The second fiber section 4 further preferably has an average thickness of 100-1000 µm, preferentially 200-900 µm, preferentially 300-800 µm, more preferentially 400-700 µm and most preferentially 500 µm in the area of a thickening 5.

It was surprisingly discovered that a nonwoven fabric 1 having thickenings 5 disposed therein increases the rigidity of said nonwoven fabric 1. This is in particular due to the fact that when the nonwoven fabric 1 is being produced, the thickenings 5 in the second fiber sections cool more slowly than the fiber strand 2 in the first fiber sections 3 and the third fiber sections 6. Particularly the accumulation of polymer in the second fiber sections 4 of the fiber strand 1 thereby results in the slower cooling.

On the one hand, the cooled thickenings 5 form a reinforcement in the nonwoven fabric 1, on the other hand, further parts of the fiber strand 2 and/or other fiber strands 2 are also at least partly fused with the thickening 5 so that the entire area around a thickening 5 results in a reinforcement of the material. At the same time, however, the thickening 5 remains a part of the fiber strand 2 with similar surface structure and can thus absorb particles to be filtered.

Figure 10:
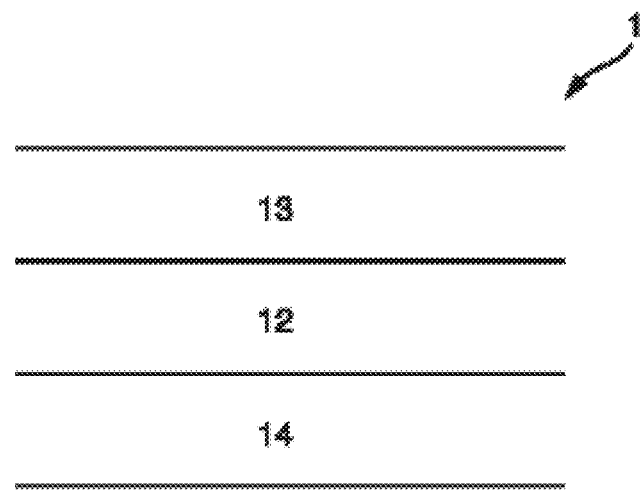
FIG. 10 is a partial schematic representation of an inventive nonwoven fabric having three layers.
Figure 11:
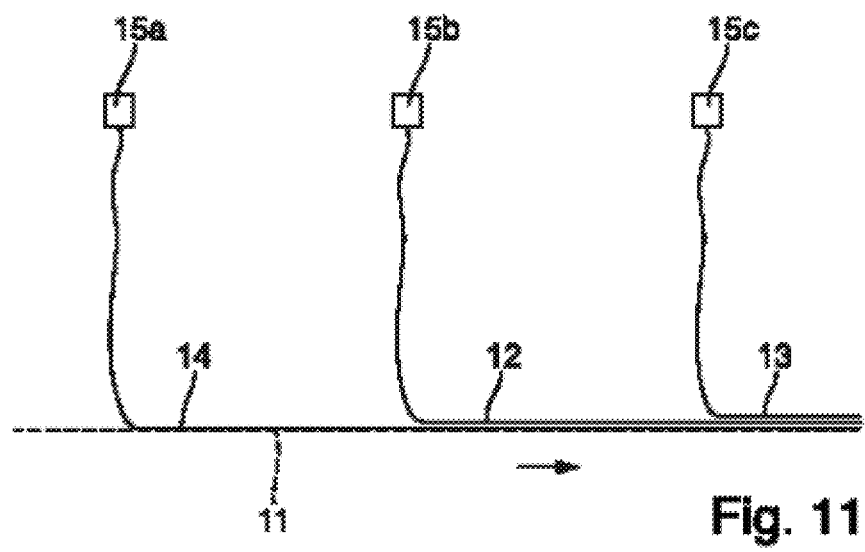
FIG. 11 is a partial schematic representation of a manufacturing process for an inventive nonwoven fabric having three layers.
Figure 12:
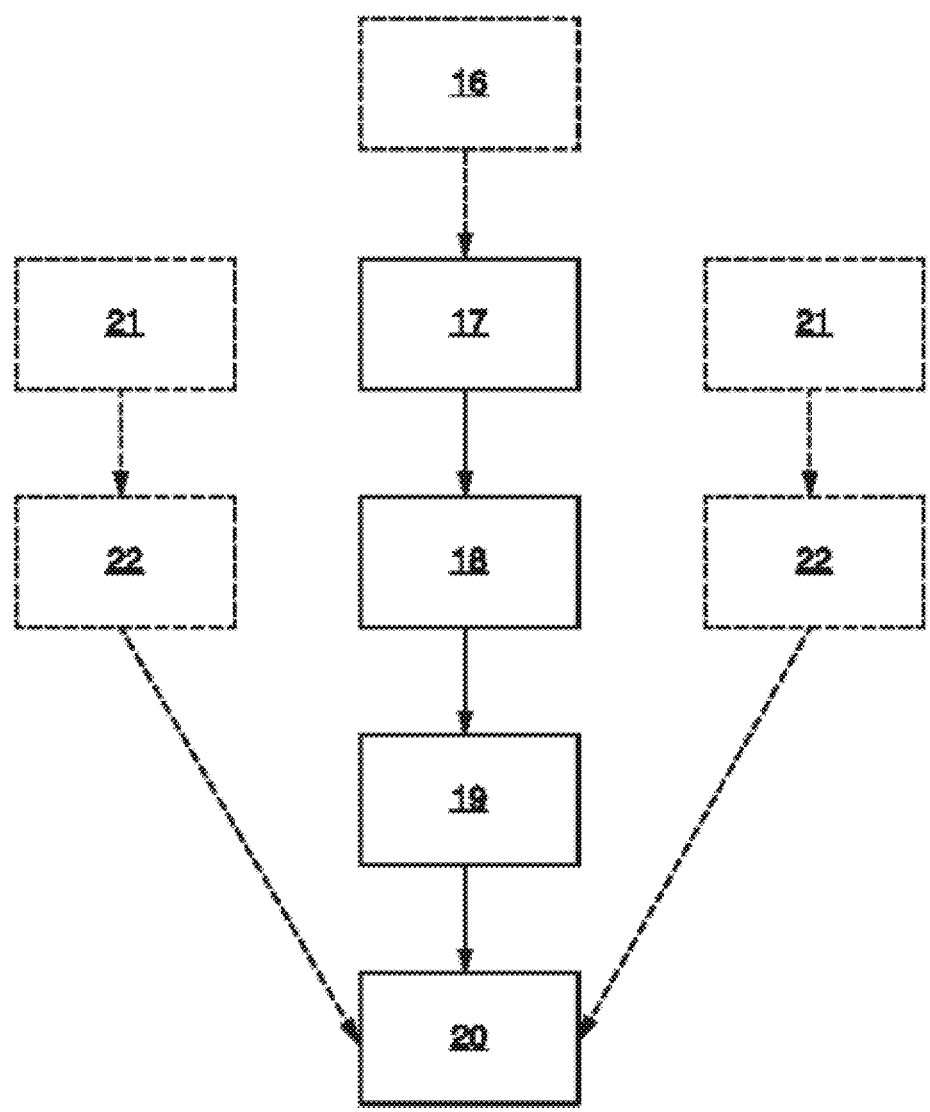
FIG. 12 is a block diagram partly schematically depicting a manufacturing process for an inventive nonwoven fabric having three layers.

FIG. 10 shows an inventive nonwoven fabric 1 according to a further embodiment of the invention. Here, the nonwoven fabric 1 has three layers 12, 13, 14. These three layers 12, 13, 14 are preferably produced in a collective primary forming process as per FIG. 11. In said process, three spinning beams 15a, 15b, 15c are preferably arranged in succession over a substrate 11 and simultaneously deposit fiber strands 2 on the substrate 11, preferably in a melt-blown or a spun-bond process, which is moving toward the right in FIG. 11. A second layer 13 is produced by the left spinning beam 15a, a first layer 12 by the middle spinning beam 15b, as described above, and a third layer 14 by the right spinning beam 15c. The sequence with which the three layers 12, 13, 14 are deposited is thereby not limited to the present embodiment as described, but rather can accordingly occur in any given order. Preferably, the inventive nonwoven fabric can also only have two layers, the first layer 12 and the second layer 13 or the first layer 13 and the third layer 14, whereby each of the respective two layers can be deposited first during the manufacturing method. Further preferably, production can also be realized with just one spinning beam, its nozzles able to extrude different respective polymers.

The second layer 13 and the third layer 14 can thereby be produced by means of the same method as the first layer 12, preferably, however, different methods are used to produce layers having different properties. Preferably, the second layer 13 is a relatively coarse nonwoven fabric 1 in order to further stabilize the nonwoven fabric 1 and/or be able to prefilter coarse particles. The third layer 14 is preferably an electret filter, same increasing the particulate matter storage capacity as well as the filtration efficiency by electrostatic binding of particles.

The second layer 13 preferably has a mass distribution of approximately 45-75 g/m², preferentially approximately 50-70 g/m², particularly preferentially approximately 55-65 g/m² and most preferentially approximately 60 g/m², and further preferably a thickness of approximately 0.5-0.9 mm, preferentially approximately 0.6-0.8 mm and most preferentially approximately 0.7 mm. Further preferably, the second layer 13 has an air permeability of approximately 3000-4000 l/(m²s), preferentially approximately 3250-3750 l/(m²s) and most preferentially approximately 3500 l/(m²s), and further preferably a filtration efficiency of approximately 10-25%, preferentially approximately 15-20% and most preferentially approximately 17.5%. The second layer 13 further preferably has an average pore size pursuant to the bubble point test of greater than 65-120 µm, preferentially 70-90 µm and most preferentially 80 µm.

The third layer 14 preferably has a mass distribution of approximately 35-60 g/m², preferentially approximately 40-55 g/m², particularly preferentially approximately 45-50 g/m² and most preferentially approximately 47.5 g/m², and preferably a thickness of approximately 0.4-0.7 mm, preferentially approximately 0.5-0.6 mm and most preferentially approximately 0.55 mm. The third layer 14 further preferably has an air permeability of approximately 800-1300 l/(m²s), preferentially approximately 900-1200 l/(m²s) and most preferentially approximately 1000 l/(m²s), and/or a filtration efficiency of approximately 40-80%, preferentially approximately 50-70% and most preferentially approximately 60%. The third layer 14 further preferably has an average pore size pursuant to the bubble point test of greater than 10-60 µm, preferentially 20-50 µm, preferentially 30-40 µm and most preferentially 35 µm.

Together, the three layers 12, 13, 14 preferably have a mass distribution of approximately 105-180 g/m², preferentially approximately 120-160 g/m² and most preferentially approximately 140 g/m², and further preferably a thickness of approximately 1.2-2.5 mm, preferentially approximately 1.3-2.3 mm, particularly preferentially approximately 1.5-2.1 mm, preferentially approximately 1.7-1.9 mm and most preferentially approximately 1.8 mm. The collective air permeability amounts to approximately 500-1300 l/(m²s), preferentially approximately 600-1200 l/(m²s), particularly preferentially approximately 800-1000 l/(m²s) and most preferentially approximately 900 l/(m²s).

The average pore diameter of the three layers amounts preferably to 15-25 µm.

The inventive effect can also be achieved at the peripheries of the respective specifications of range. Additionally, all of the cited parameter values are average values which can deviate significantly at individual locations within the respective layers.

The invention claimed is:

1. A fabric (1) for a filter medium, comprising a nonwoven first layer (12), wherein at least one integral fiber strand (2) of the first layer (12) has at least one first fiber section (3) and at least one second fiber section (4) each section having a respective end, the at least one first fiber section and the at least second fiber section being arranged consecutively in a longitudinal direction of the fiber strand extending in a longitudinal direction along an axis, wherein the at least one first fiber section and the at least one second fiber section are of one piece joined to each other at their respective ends, characterized in that the fiber strand (2) comprises a thickening (5) in the at least one second fiber section (4), the thickening provided by the at least one second fiber section itself, wherein the first fiber section (3) consists of a first polymer mixture comprising a first polymer (9), and the second fiber section (4) consists of a second polymer mixture comprising a second polymer (10), wherein the second polymer mixture has a higher viscosity than that of the first polymer mixture, and the second polymer (10) has a higher viscosity than that of the first polymer (9), and wherein the first polymer mixture comprises different polymers from the polymers of the second polymer mixture, wherein the first and second fiber sections extend across the entire cross-section of the integral fiber, wherein granulate clusters of the second polymer or second polymer mixture are homogeneously mixed with granulates of the first polymer or polymer mixture, such that, in the melted state islands of the second polymer or second polymer mixture are formed, making the first polymer or first polymer mixture inhomogeneous, and wherein in a polymer melt which produces the at least one fiber strand (2) provide areas in the polymer melt in which different polymers dominate, such that the first (3) and the second (4) fiber sections are of differing material structures when the polymer melt discharges from a spinning beam in a primary forming process.

2. The fabric (1) for a filter medium according to claim 1, wherein the thickening has a thickness diameter at its widest point and the at least one first fiber section (3) has an average diameter, and wherein the ratio of the thickness diameter at its widest point to the average diameter of the at least one first fiber section is at least 3:1.

3. The fabric (1) for a filter medium according to claim 1, wherein the fiber strand in the first fiber section has an average diameter of 0.5-20 μm.

4. The fabric (1) for a filter medium according to claim 1, wherein the thickening has a thickness diameter at its widest point and the thickening has a longitudinal extent of the thickening, and the ratio of the thickness diameter to the longitudinal extent is 0.5:1 to 4:1.

5. The fabric (1) for a filter medium according to claim 1, wherein the fiber strand includes loops and the thickening (5) comprises entwined loops of the fiber strand.

6. The fabric (1) for a filter medium according to claim 1, wherein the thickening (5) has an area (8) in which the fiber strand (2) rests upon itself and is at least partially fused in said area (8).

7. The fabric (1) for a filter medium according to claim 1, wherein the second polymer mixture includes the first polymer and wherein the percentage of the second polymer (10) in the second polymer mixture amounts to 2-20% by weight of the melt.

8. The fabric (1) for a filter medium according to claim 1, wherein the integral fiber strand (2) comprises a third fiber section (6) which adjoins the second fiber section (4) and has the structure of the first fiber section (3).

9. The fabric (1) for a filter medium according to claim 1, wherein the first layer (12) has a mass distribution of 25-45 g/m$^2$ and a thickness of 0.4 mm to 0.7 mm.

10. The fabric (1) for a filter medium according to claim 1, wherein the first layer (12) has an average of 2 to 10 thickenings/cm$^2$.

11. The fabric (1) for a filter medium according to claim 1, wherein the first layer (12) has an air permeability of 5000-7000 l/(m$^2$s) and/or a filtration efficiency of 10-20%.

12. The fabric (1) for a filter medium according to claim 1 which additionally comprises a second layer (13), the pore size of which is on average smaller than that of the first layer.

13. The fabric (1) for a filter medium according to claim 12, wherein the second layer (13) has a mass distribution of 45-75 g/m$^2$ and a thickness of 0.5-0.9 mm.

14. The fabric (1) for a filter medium according to claim 12, wherein the second layer (13) has an air permeability of 3000-4000 l/m$^2$s and/or a filtration efficiency of 10-25%.

15. The fabric (1) for a filter medium according to claim 12, which additionally comprises a third layer (14), the pore size of which is on average smaller than that of the second layer and which third layer is disposed on a side of the first layer opposing the second layer so the first layer is disposed between the second and third layers.

16. The fabric (1) for a filter medium according to claim 15, wherein the third layer (14) has a mass distribution of 35-60 g/m$^2$ and a thickness of 0.4-0.7 mm.

17. The fabric (1) for a filter medium according to claim 15, wherein the third layer (14) has an air permeability of 800-1300 l/(m$^2$s) and/or a filtration efficiency of 40-80%.

18. The fabric (1) for a filter medium according to claim 15, wherein the three layers (12, 13, 14) together have a mass distribution of 105-180 g/m$^2$ and a thickness of 1.2-2.5 mm.

19. The fabric (1) for a filter medium according to claim 15, wherein the three layers (12, 13, 14) together have an air permeability of 500-1300 l/(m$^2$s).

20. A filter having a fabric (1) according to claim 1, wherein the fabric (1) is pleated.

21. A method for producing the fabric of claim 1, comprising the following procedural steps:
providing a first polymer melt;
producing the first layer from the first polymer melt in a melt-blown or spun-bond process;
varying, periodically or oscillatorily, at least one process parameter in the melt-blown or spun-bond process, the process parameter including one or more of the process temperature, the composition of the polymer melt, the polymer flow, and the process airspeed, to produce the at least one integral fiber strand from two fiber sections having different structures; and
depositing the fiber strand on a substrate.

22. The method according to claim 21 comprising
mixing (16) at least two polymers or polymer mixtures (9, 10) to produce the first polymer melt (9, 10) in the manner such that the polymers or polymer mixtures (9, 10) are inhomogeneously distributed in the first polymer melt (9, 10).

23. The method according to claim 21 comprising
providing (21) a second polymer melt and/or a third polymer melt;
producing (22) a second layer (13) from the second polymer melt and/or third layer (14) from the third polymer melt, wherein the first layer (12) and the second layer (13) and/or the third layer (14) are simultaneously produced in a single primary forming process which process is one or more of the melt-blown or spun-bond process.

* * * * *